United States Patent
Yong et al.

(10) Patent No.: US 7,316,866 B2
(45) Date of Patent: Jan. 8, 2008

(54) IONIC LIQUID-MODIFIED CATHODE AND ELECTROCHEMICAL DEVICE USING THE SAME

(75) Inventors: Hyun Hang Yong, Seoul (KR); Sang Young Lee, Daejeon (KR); Seok Koo Kim, Daejeon (KR); Soon Ho Ahn, Daejeon (KR)

(73) Assignee: LG Chem, Ltd. (KR)

( * ) Notice: Subject to any disclaimer, the term of this patent is extended or adjusted under 35 U.S.C. 154(b) by 435 days.

(21) Appl. No.: 11/026,392

(22) Filed: Dec. 30, 2004

(65) Prior Publication Data

US 2005/0175898 A1    Aug. 11, 2005

(30) Foreign Application Priority Data

Dec. 30, 2003   (KR) ............... 10-2003-0100100

(51) Int. Cl.
*H01M 4/58* (2006.01)
*H01M 4/50* (2006.01)
*H01M 4/00* (2006.01)

(52) U.S. Cl. .................................. 429/231.1
(58) Field of Classification Search ............ 429/231.1, 429/231.95, 231.5, 218.1, 224, 220
See application file for complete search history.

(56) References Cited

U.S. PATENT DOCUMENTS

| 4,624,754 | A  | 11/1986 | McManis et al. ........ 204/58.5 |
| 6,368,486 | B1 | 4/2002 | Thompson et al. ......... 205/406 |
| 2002/0110737 | A1 | 8/2002 | Park et al. |
| 2002/0110739 | A1 | 8/2002 | McEwen et al. ............ 429/324 |
| 2005/0081370 | A1* | 4/2005 | Kurihara et al. ........... 29/623.3 |

FOREIGN PATENT DOCUMENTS

| JP | 11-086905 | 3/1999 |
| JP | 11-260400 | 9/1999 |
| JP | 11-297335 | 10/1999 |
| JP | 2002-110225 | 4/2002 |
| WO | WO 01/93362 A1 | 6/2001 |
| WO | WO 01/32308 A1 | 10/2001 |
| WO | WO 02/26381 A2 | 4/2002 |

OTHER PUBLICATIONS

PCT International Search Report, International Application No. PCT/KR2004/003434, International Filing Date: Dec. 24, 2005, Date of Mailing: Mar. 30, 2005.

* cited by examiner

*Primary Examiner*—Patrick Joseph Ryan
*Assistant Examiner*—Thomas H. Parsons
(74) *Attorney, Agent, or Firm*—Cantor Colburn LLP (57) ABSTRACT

The present invention provides a cathode produced from a cathode slurry comprising: (a) a cathode active material based on a lithium-containing metal composite oxide or a chalcogenide compound; and (b) an ionic liquid, as well as an electrochemical device including the cathode. The inventive cathode can greatly improve the safety of batteries without causing a significant deterioration in the battery performance.

13 Claims, 5 Drawing Sheets

IONIC LIQUID-MODIFIED CATHODE AND ELECTROCHEMICAL DEVICE USING THE SAME

TECHNICAL FIELD

The present invention relates to a cathode (positive electrode) capable of improving the safety of batteries without deteriorating the battery performance, and more particularly, to a cathode modified with an ionic liquid, as well as an electrochemical device including the same.

BACKGROUND ART

Recently, interests in energy storage technology are gradually increased. As the use of batteries is enlarged to applications for the storage of energy for portable telephones, camcorders, notebook computers, personal computers and electric vehicles, efforts on the research and development of the batteries are increasingly embodied. In this view, the field of electrochemical devices receives the greatest attention, and among them, interests in the development of chargeable/dischargeable secondary batteries are focused.

Among secondary batteries which are now in use, lithium secondary batteries developed in the early 1990s are in the spotlight due to the advantages of higher operation voltages and far greater energy densities than those of conventional batteries, such as Ni—MH, Ni—Cd and sulfuric acid-lead batteries. However, the lithium secondary batteries are disadvantageous in that they have safety problems, such as firing and explosion, caused by the use of organic electrolytes, and their preparation requires a complicated process.

Meanwhile, ionic liquid, also called "room temperature molten salt", means a salt showing liquid properties at room temperature. The ionic liquid consists generally of organic cations and inorganic anions and is characterized by having high evaporation temperature, high ion conductivity, thermal resistance, nonflammability and the like. The ionic liquid is applied in solvents for organic synthesis, solvents for separation and extraction, and the like, and recently, there are studies on the possibility for the application of the ionic liquid to an electrolyte solution for electrochemical devices, such as capacitors, lithium ion batteries, fuel batteries and the like. Most of such studies concern electrolyte solutions for capacitors, and many studies on the application of the ionic liquid to an electrolyte solution for lithium ion batteries are now conducted in Japan and USA as leaders, but not yet put to practical use due to the problems of a reaction between the ionic liquid and the carbon-based anode, and an increase in the viscosity of the electrolyte solution.

U.S. Patent Application No. 2002-0110737 discloses the application of the ionic liquid to an electrolyte solution for lithium ion batteries. This patent application describes that, by the selection of a suitable ionic liquid and the control of the ratio of the selected ionic liquid to the existing electrolyte solution, the ionic liquid can show nonflammability. Also, it describes that the reaction between the ionic liquid and the carbon-based anode can be inhibited by a process for injecting the electrolyte solution in two steps. However, the two-step process for injecting the electrolyte solution has problems in that the process is difficult to be actually applied and to produce an ionic liquid whose reaction with an anode (negative electrode) has been inhibited. Also, due to the high viscosity of the ionic liquid, an increase in the viscosity of the mixed electrolyte solution cannot be avoided, thus causing the deterioration in the battery performance.

Furthermore, Japanese Patent Laid-Open Publication Nos. Hei 11-86905 and 11-260400 disclose the application of an imidazolium cation-containing liquid to an electrolyte solution for ion batteries. However, the ionic liquid used in such patents has a problem in that it shows a higher reduction potential than that of lithium ions so that it is reduced faster than lithium ions in the anode.

In an attempt to solve the problem of the high reduction potential of the ionic liquid as described above, Japanese Patent Laid-Open Publication No. Hei 11-297335 discloses an ionic liquid based on ammonium with a lower reduction potential than that of lithium. In this case, the reduction potential problem can be overcome, but there is a problem in that the ionic liquid is co-intercalated with lithium ions into the carbon-based anode.

In an attempt to solve the problem of the co-intercalation of the ionic liquid with the carbon-based anode, Japanese Patent Laid-Open Publication No. 2002-110225 discloses the use of a titanium-based anode. However, even in this case, there is a problem in that, due to the high viscosity of the ionic liquid, the high-efficiency discharge performance of batteries will be deteriorated when the ionic liquid is applied in the batteries.

DISCLOSURE OF THE INVENTION

The present inventors have many studies to solve the above-mentioned problems in the prior art, and consequently, found that the use of an ionic liquid as one component of a cathode (positive electrode) other than use as an electrolyte solution can not only realize the improvement of battery safety, but also prevent the deterioration in battery performance caused by a reaction between the ionic liquid and the carbon-based anode (negative electrode) and an increase in the electrolyte viscosity which occurs as a result of the addition of the ionic liquid with high viscosity.

Accordingly, it is an object of the present invention to provide a cathode modified with ionic liquid, which can improve the safety of batteries without deteriorating the battery performance, as well as an electrochemical device including the cathode.

To achieve the above object, the present invention provides a cathode produced from a cathode slurry comprising: (a) a cathode active material based on a lithium-containing metal composite oxide or a chalcogenide compound; and (b) an ionic liquid.

Also, the present invention provides an electrochemical device including said cathode, and preferably a lithium secondary battery.

Hereinafter, the present invention will be described in detail.

Although it is known that the use of the ionic liquid as an electrolyte additive can improve the safety of batteries, it is only known in this technical field that this improvement is attributable to the inherent high boiling point and nonflammability of the ionic liquid, but the actual mechanism of the ionic liquid on the improvement of the battery safety is not yet precisely established. Moreover, the use of the ionic liquid as the electrolyte additive could realize the improvement of the battery safety as described in the prior art, but necessarily caused the deterioration in the battery performance due to a reaction between the ionic liquid added and the carbon-based anode, and/or an increase in the electrolyte viscosity by the ionic liquid with high viscosity.

The present invention is characterized in that the ionic liquid (IL) known to be able to improve the battery safety upon use in an electrolyte solution is used as one component of the cathode without use as an electrolyte component.

By virtue of this characteristic, the cathode according to the present invention can satisfy both the improvement of the battery safety and the prevention of deterioration in the battery performance as described below.

First, the cathode prepared with the ionic liquid as one component of the cathode can improve the battery safety. As described above, the mechanism where the use of the ionic liquid improves the battery safety is not yet precisely established, but can be believed to be attributable to the following factors. Namely, the prior cathode active materials based on lithium-containing metal oxides or chalcogenide compounds are lithium intercalation compounds whose structural stability and capacity are determined by the intercalation and deintercalation reactions of lithium ions. With an increase in charge potential, the capacity of such compounds increase, whereas such compounds become structurally unstable, thus causing a rapid reduction in the thermal stability of the electrode. If oxygen is generated due to the structural instability of the electrode as described above, the oxygen will be highly exothermic so that it will cause thermal runaway in batteries and provide a possibility for the oxygen to react with the electrolyte within batteries so as to explode the batteries.

However, in the present invention, a portion or all of the surface of the cathode active material is surrounded by the ionic liquid with characteristics including high boiling point, thermal resistance and nonflammability. Thus, the oxygen generation by the structural instability of the electrode can be prevented so as to improve the safety, particularly thermal safety, of batteries. Particularly, cations with relatively less electrons in the ionic liquid can inhibit the generation of highly exothermic oxygen by attraction with oxygen enriched in unpaired electrons, thus improving the battery safety.

Second, the cathode prepared using the ionic liquid as one component of the cathode according to the present invention can prevent the deterioration in the battery performance occurring due to the ionic liquid added. Namely, as described in the prior art, the use of the ionic liquid in the electrolyte solution caused the deterioration in the battery performance due to an increase in the electrolyte viscosity by the ionic liquid with high viscosity, and/or a reaction between the ionic liquid and the anode.

Of the above-mentioned performance deteriorations, the performance deterioration caused by the reaction between the ionic liquid and the anode is generally attributable to the following three factors. The first factor occurs because the ionic liquid has a higher reduction potential than that of lithium so that the cations of the ionic liquid are reduced faster than lithium ions in the anode. This factor can be solved by limiting the kind of ionic liquid. The second factor occurs because the ionic liquid is co-intercalated with lithium ions into a carbon material constituting the anode, and this factor can be solved by the use of an anode material other than the carbon material. The third factor fundamentally occurs regardless of the kinds of the ionic liquid and the anode material. Namely, if lithium ions are reduced in the anode, the ionic liquid cations with a similar electrochemical window to lithium, among ions present in the battery, will show a tendency to also be competitively reduced. In this case, it can be expected that the reduction of lithium ions will be predominant since the reaction rate of lithium ions with relatively small molecular weight is faster. In practice, however, the contrary results were shown (see FIG. 2). Namely, the ionic liquid cations can reach the anode faster than lithium ions solvated in the electrolyte solution so that they can form a barrier layer against lithium ions (see FIG. 3), thus the deterioration in the battery performance can be caused.

The prior art has attempted to solve the first and second factors easy to solve among the above-described factors. However, in the present invention, in addition to the first and second factors, the third factor that is the most fundamental factor was found, and to solve the third factor, the ionic liquid is localized only to the cathode so that the deterioration in the battery performance caused by the use of the ionic liquid can be prevented.

Also, according to the present invention, even if the ionic liquid present in the cathode flows out to the electrolyte solution after a battery reaction progressed, the deterioration in the battery performance by a reaction between the ionic liquid and the anode can be inhibited since a normal solid electrolyte interface (SEI) was formed at the initial stage of charge cycles by a reaction between the anode and the electrolyte solution.

As a component which is added to a cathode slurry comprising a cathode active material based on a lithium-containing metal composite oxide or a chalcogenide compound according to the present invention, any conventional ionic liquid known in the art, which can realize both the improvement of battery safety and the prevention of the deterioration in battery performance as described above, may be used. Regarding concrete examples of the ionic liquid, the cations of the ionic liquid include imidazolium, pyrazolium, triazolium, thiazolium, oxazolium, pyridazinium, pyrimidinium, pyrazinium, ammonium, phosphonium, pyridinium or pyrrolidinium, which may be substituted or unsubstituted with a $C_{1-15}$ alkyl group, as well as mixtures thereof, and the anions of the ionic liquid include $PF_6^-$, $BF_4^-$, $—CF_3SO_3^-$, $N(CF_3SO_2)_2^-$, $N(C_2F_5SO_2)_2^-$, $C(CF_2SO_2)_3^-$, $AsF_6^-$, $AlCl_4^-$, $NbF_6^-$, $HSO_4^-$, $ClO_4^-$, $CH_3SO_3^-$, $CF_3CO_2^-$ or mixtures thereof Also, the ionic liquid may be a zwitterionic compound, an ionic structure which is formed by the covalent bonding of cations and anions so as to bear negative electricity and positive electricity.

The amount of the ionic liquid to be introduced into the cathode is preferably 0.1-30 parts by weight based on 100 parts by weight of the cathode active material, and can be controlled to a suitable amount based on the design of final battery capacity. If it is used at an amount of less than 0.1 part by weight, it will show an insignificant effect on the improvement of the thermal stability of the cathode, and if it is used at an amount of more than 30 parts by weight, the relative amount of the active material in the cathode will be reduced, thus causing a reduction in the overall capacity of the battery.

A method for preparing the cathode comprising ionic liquid as one component thereof according to the present invention is not limited to any specific method. In one embodiment, the cathode may be prepared by any conventional method known in the art, for example, by applying on a current collector a cathode slurry comprising an ionic liquid and a cathode active material based on a lithium-containing metal composite oxide or chalcogenide compound, which can store and release lithium. In this case, a small amount of a conducting agent and/or a binder may optionally be added.

Hereinafter, the method for preparing the cathode according to the present invention will be described in detail. Electrode materials, including a lithium-containing metal composite oxide or chalcogenide compound-based cathode active material, an ionic liquid, and optionally a binder and/or a conducting agent, etc., are dispersed in solvent or dispersion medium, such as N-methylpyrrolidone (NMP), so as to prepare a cathode slurry. The prepared slurry is coated on a cathode current collector and subjected to a heat treatment process followed by a pressing process.

Among cathode components to be introduced with the ionic liquid, the lithium-containing metal composite oxide-based cathode active material is a lithium-containing oxide including at least one element selected from the group consisting of alkali metals, alkaline earth metals, Group 13 elements, Group 14 elements, Group 15 elements, transition metals and rare earth elements. Examples thereof include, but are not limited to, lithium manganese oxide (e.g., $LiMn_2O_4$), lithium cobalt oxide (e.g., $LiCoO_2$), lithium nickel oxide (e.g., $LiNiO_2$), lithium iron oxide (e.g., $LiFePO_4$) or combinations thereof. Also, examples of the chalcogenide compound-based cathode active material include, but are not limited to, $TiS_2$, $SeO_2$, $MoS_2$, $FeS_2$, $MnO_2$, $NbSe_3$, $V_2O_5$, $V_6O_{13}$, $CuCl_2$ or mixtures thereof.

As the conducting agent, any material may be used as long as it is an electron-conducting material which does not cause chemical changes within a constructed battery. Examples of the conduction material include, but are not limited to, carbon black, such as acetylene black, ketzen black, furnace black or thermal black, natural graphite, artificial graphite, conductive fibers, and the like.

As the binder, thermoplastic resin, thermosetting resin or a combination thereof may be used, and examples of the binder include, but are not limited to, polyvinylidene fluoride (PVdF), polytetrafluoroethylene (PTFE) and the like.

The current collector may be made of any conductive material, but in the case of the cathode, is preferably a foil made of aluminum, nickel or a combination thereof.

Figure 1:
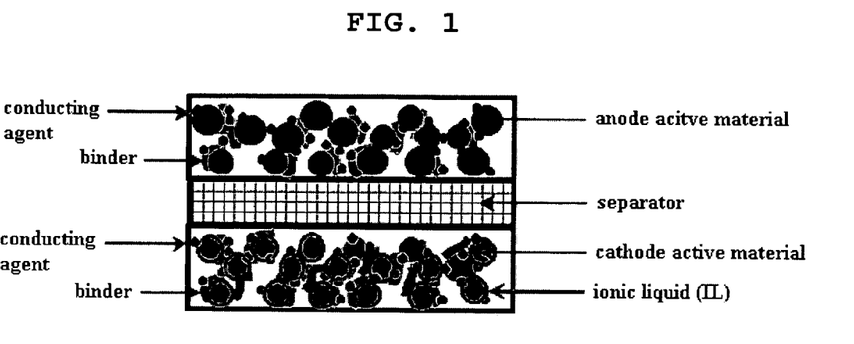
FIG. 1 is a schematic diagram showing the structure of a battery comprising a cathode introduced with an ionic liquid, an anode, and a separator interposed between the two electrodes.

As shown in FIG. 1, in the cathode prepared as described above, the ionic liquid is present either on the surface of the cathode active material particles or between the particles, so that not only the improvement of the battery safety as described above is achieved but also the deterioration of the battery performance is prevented.

In another aspect, the present invention provides an electrochemical device comprising: (a) a cathode produced from a cathode slurry comprising a cathode active material based on a lithium-containing metal composite oxide or a chalcogenide compound, and an ionic liquid; (b) an anode; (c) a separator; and (d) an electrolyte solution.

The electrochemical devices according to the present invention include all devices in which electrochemical reactions occur. Specific examples of such devices include primary and secondary batteries, and the like.

A method of preparing the electrochemical device using the electrode produced as described above may be performed by any conventional method known in the art. In one embodiment of the method, the separator is interposed between the two electrodes to form an assembly into which the electrolyte solution is then injected.

In this case, the heat release of the cathode containing the ionic liquid, to the electrolyte solution, is preferably at least 0.01 J/g lower than that of a cathode containing no ionic liquid. Also, the temperature at which the heat release of the ionic liquid-containing cathode to the electrolyte solution is the highest upon the increase of the outside temperature is preferably at least 0.01° C. lower than the temperature at which the heat release of the cathode containing no ionic liquid is the highest.

The electrochemical devices prepared by the above-described method are preferably lithium secondary batteries, including lithium metal secondary batteries, lithium ion secondary batteries, lithium polymer secondary batteries, lithium ion polymer secondary batteries, etc.

In this case, the anode according to the present invention may be prepared by settling an anode active material to an anode current collector, according to any conventional method known in the art. Particularly, unlike the prior art, a carbon-based material may also be used as the anode active material without limitations. Examples of the anode active material include, but are not limited to, lithium-adsorbing materials, such as lithium metals or lithium alloys, carbon, petroleum coke, activated carbon, graphite or other carbons. Examples of the anode current collector include, but are not limited to, foils made of copper, gold, nickel, copper alloy, or a combination thereof.

A separator which can be used in the present invention is not limited to any specific separator, but a porous separator may be used and examples thereof include porous polypropylene, polyethylene or polyolefin separators.

Examples of the electrolyte solution which can be used in the present invention include, but are not limited to, salts of a structure such as $A^+B^-$, wherein $A^+$ contains an ion selected from alkaline metal cations, such as $Li^+$, $Na^+$ and $K^+$, and combinations thereof, and $B^-$ contains an ion selected from anions, such as $PF_6^-$, $BF_4^-$, $Cl^-$, $Br^-$, $I^-$, $ClO_4^-$, $ASF_6^-$, $CH_3CO_2^-$, $CF_3SO_3^-$ $N(CF_3SO_2)_2^-$, and $C(CF_2SO_2)_3^-$, and combinations thereof, are dissolved or dissociated in an organic solvent selected from the group consisting of propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethylmethyl carbonate (EMC), γ-butyrolactone and a mixture thereof.

The injection of the electrolyte solution may be performed in a suitable stage during a manufacture process of the electrochemical devices, depending on a particular preparation process of a final product and physical properties required for the final product. Namely, the electrolyte solution may be injected before the assembling of the electrochemical device or a final stage during the assembling.

The external shape of the electrochemical device is not limited to any specific shape, but may be a cylindrical shape with a can, an angular shape, a pouch shape, and a coin shape.

BEST MODE FOR CARRYING OUT THE INVENTION

Hereinafter, the present invention will be illustrated by way of the following examples. It is to be understood, however, that these examples are given for illustrative purpose only and are not construed to limit the scope of the present invention.

REFERENCE EXAMPLE 1

Each of BDMI-$PF_6$ and Li$PF_6$ were dissolved in propylene carbonate (PC) so as to prepare electrolyte solutions. The electrolyte concentration of the solutions was controlled to a range of 0.25M to 1.5M. Each of the solutions was measured for ionic diffusion coefficient by PMG-NMR (pulsed field gradient-NMR, Bruker DRX-600 spectrometer).

Figure 2:
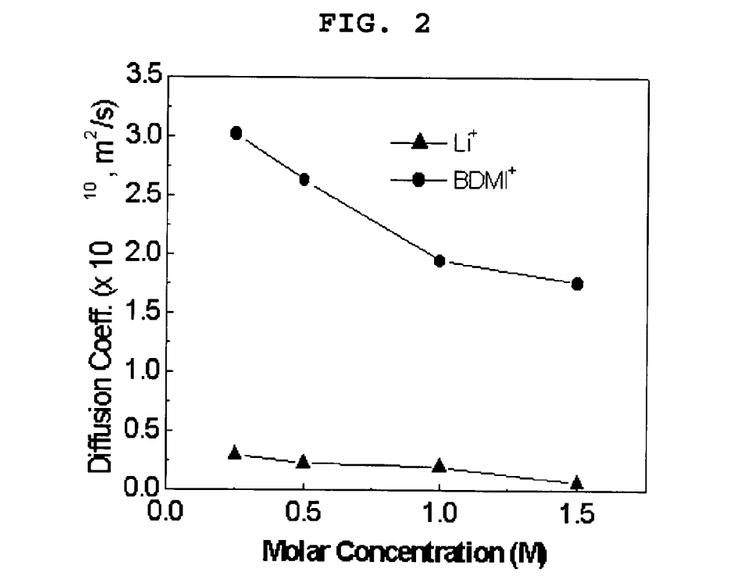
FIG. 2 is a graphic diagram showing the comparison between the ionic dispersion coefficients of $BDMI^+$ and $Li^+$ in solutions which contain $BDMI\text{-}PF_6$ and $LiPF_6$ dissolved in propylene carbonate (PC), respectively.
Figure 3:
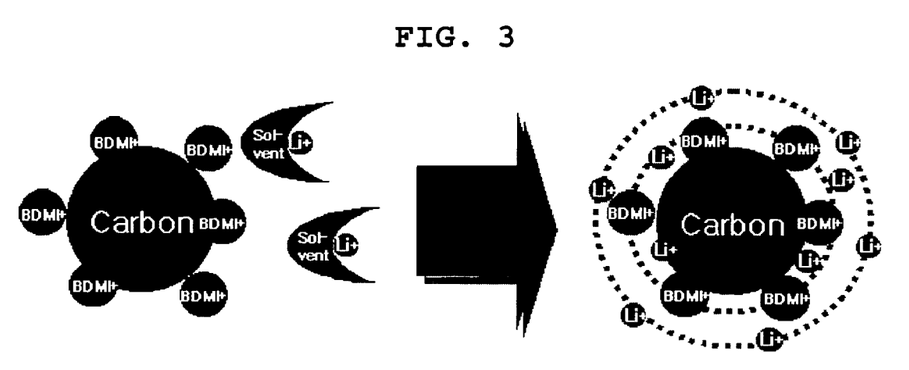
FIG. 3 is a schematic diagram showing a reaction between the anode of a lithium secondary battery and electrolyte containing $BDMI\text{-}PF_6$ and $LiPF_6$ dissolved in propylene carbonate (PC), respectively.
Figure 4:
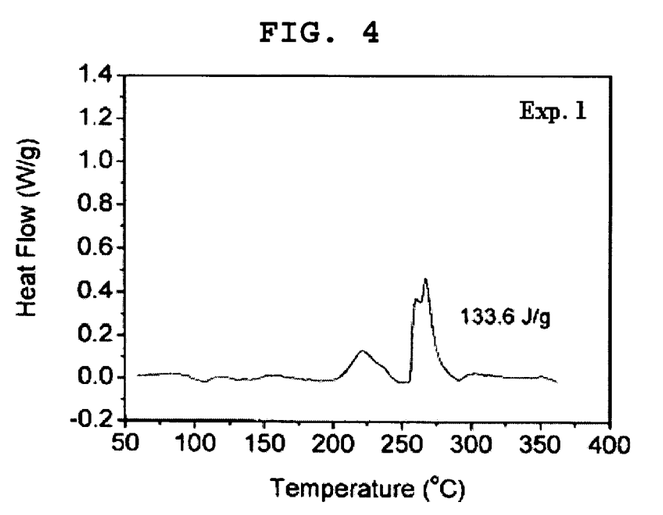
FIGS. 4 to 10 are graphic diagrams showing the evaluation result of thermal safety by DSC analysis for batteries fabricated in Examples 1 to 4 and Comparative Examples 1 to 3, respectively.
Figure 5:
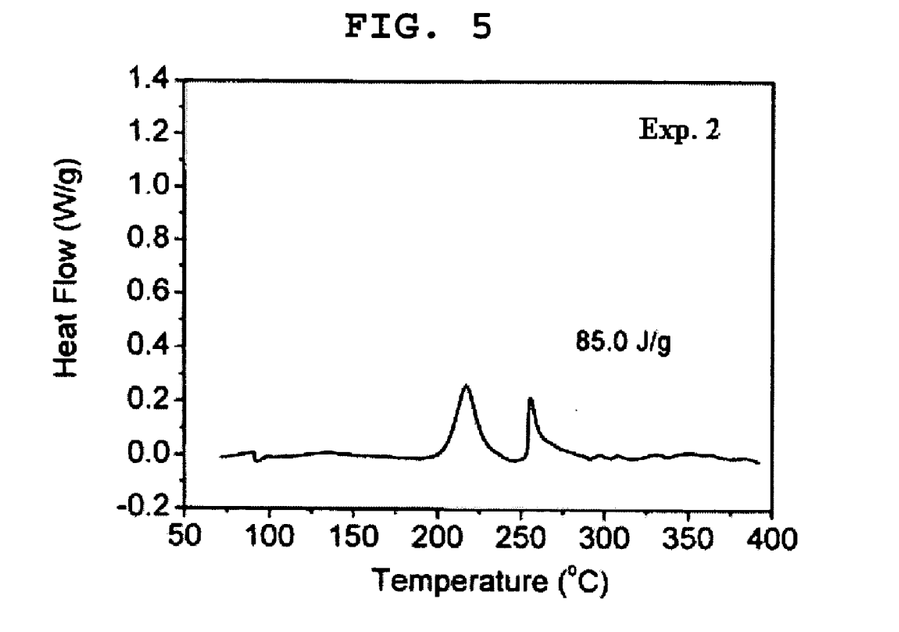
Figure 6:
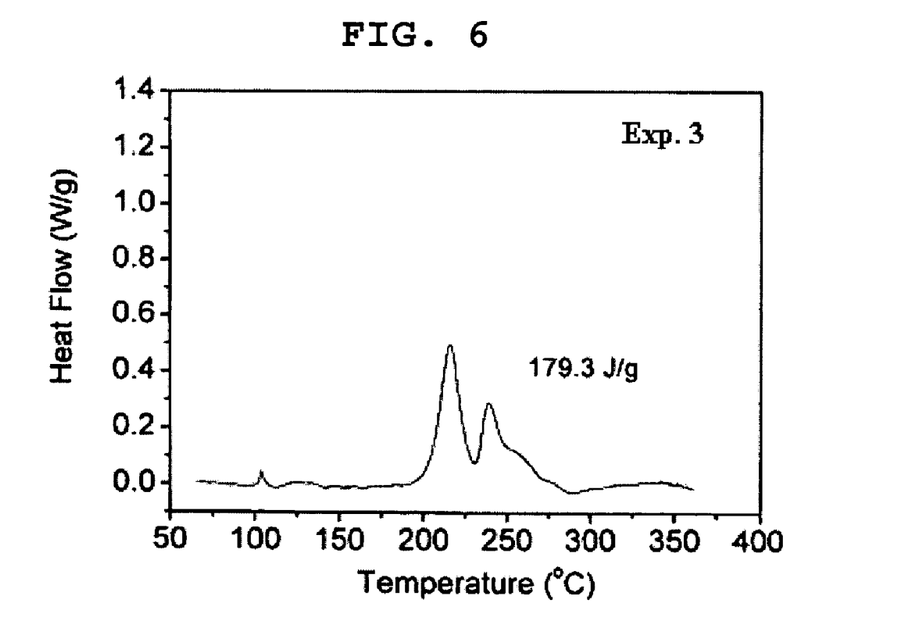
Figure 7:
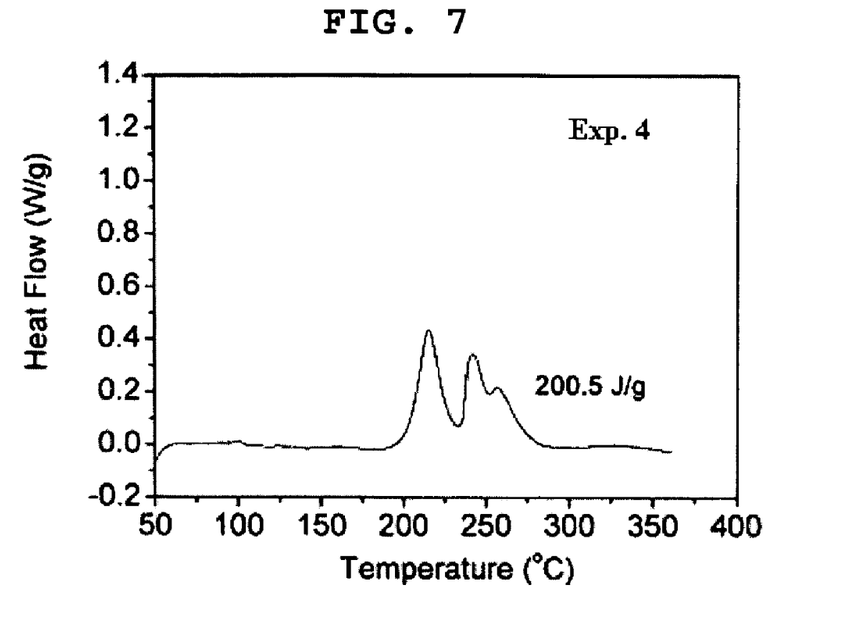

It was expected that Li$^+$ with low molecular weight would have a greater ionic diffusion coefficient than that of the cations of the ionic liquid, but actual test results showed that the cation BDMI$^+$ of BDMI-$PF_6$ had a significantly greater ionic diffusion coefficient than lithium ions (see FIG. 2). For this reason, it can be expected that if Li$^+$ and BDMI$^+$ are contained in an electrolyte solution for lithium secondary batteries, a competitive reduction reaction in the anode can progress.

EXAMPLES 1~4

Preparations of Cathodes and Lithium Secondary Batteries

Example 1

1-1: Cathode

LiCo$O_2$ as a cathode active material, carbon black as a conducting agent, and polyvinylidene fluoride (PVdF) as a binder, were mixed at a weight ratio of 94:3:3, to which BDMI-$PF_6$ as an ionic liquid was added at an amount of 3 parts by weight based on 100 parts by weight of the cathode active material. To the resulting mixture, N-methyl pyrrolidone (NMP) was added to prepare a cathode slurry. The prepared slurry was applied on an aluminum foil, and thermally treated at 130° C. for 2 hours. The cathode thus prepared was pressed and punched at 1.4875 cm$^2$.

1-2: Lithium Secondary Battery

The cathode prepared in Example 1-1 above, and an anode made by punching a Li metal foil at 1.767 cm$^2$, were provided. A polyethylene resin separator was interposed between the two electrodes (see FIG. 1), and then, an electrolyte solution which contains 1 M Li$PF_6$ and has a weight ration of EC:PC:DEC of 3:2:5 was injected into the resulting structure, thus prepared a coin-type battery.

Example 2

A cathode and a lithium secondary battery were prepared in the same manner as in Example 1 except that BMI-$PF_6$ was used in place of BDMI-$PF_6$ as an ionic liquid.

Example 3

A cathode and a lithium secondary battery were prepared in the same manner as in Example 1 except that TMHA-$PF_6$ was used in place of BDMI-$PF_6$ as an ionic liquid.

Example 4

A cathode and a lithium secondary battery were prepared in the same manner as in Example 1 except that TMHA-TFSI was used in place of BDMI-$PF_6$ as an ionic liquid.

COMPARATIVE EXAMPLES 1~4

Preparations of Cathodes and Lithium Secondary Batteries

A cathode and a lithium secondary battery were prepared in the same manner as in Example 1 except that a cathode slurry which contains no ionic liquid and has a weight ratio of active material:conducting agent:binder of 94:3:3 was used.

Comparative Example 2

A lithium secondary battery was fabricated in the same manner as in Example 1 except that a cathode was fabricated using a cathode slurry which contains no ionic liquid and has a weight ratio of active material:conducting agent:binder of 94:3:3, and then BMI-$PF_6$ was added at an amount of 3 parts by weight based on 100 parts by weight of an EC:PC:DEC (weight ratio of 3:2:5)-based electrolyte solution containing 1M lithium hexafluorophosphate (Li$PF_6$) dissolved therein.

Comparative Example 3

A lithium secondary battery was prepared in the same manner as in Example 1 except that a cathode was made by using a cathode slurry which contains no ionic liquid and has a weight ratio of active material:conducting agent:binder of 94:3:3, and then BMI-$PF_6$ was added at an amount of 10 parts by weight based on 100 parts by weight of an EC:PC:DEC (weight ratio of 3:2:5)-based electrolyte solution containing 1M lithium hexafluorophosphate (Li$PF_6$) dissolved therein.

TEST EXAMPLE 1

Evaluation of Performance of Lithium Secondary Battery

In order to evaluate the performance of the lithium secondary batteries including the cathode which have been modified with the ionic liquid according to the present invention, the following test was performed.

The batteries of Examples 1 to 4 and Comparative Examples 1 to 3 were evaluated for charge/discharge characteristics, and the evaluation results are given in Table 1 below.

The lithium secondary batteries which have been prepared by adding the ionic liquid in the production of the cathode according to the present invention showed equal performance to the battery of Comparative Example 1 with no use of the ionic liquid (see Table 1). This suggests that the ionic liquid which had been added in the production of the batteries in order to improve the battery safety did not cause the deterioration of the battery performance.

On the other hand, the batteries of Comparative Examples 2 and 3 prepared with the addition of the ionic liquid to the electrolyte solution all showed the deterioration in performance. Among them, the battery of Comparative Example 2 prepared with the addition of the ionic liquid at a relatively small amount of 3 parts by weight did not show a great deterioration in performance. However, the battery of Comparative Example 3 prepared with the addition of 10 parts by weight of the ionic liquid to 100 parts by weight of the electrolyte solution showed a great deterioration in performance as compared to the battery of Example 1 prepared using the same kind of the ionic liquid and the battery of Comparative Example 1 with no use of the ionic liquid (see FIG. 1)

TABLE 1

|  | Example 1 | | Example 2 | | Example 3 | | Example 4 | | Comparative Example 1 | | Comparative Example 2 | | Comparative Example 3 | |
| --- | --- | --- | --- | --- | --- | --- | --- | --- | --- | --- | --- | --- | --- | --- |
|  | CH | DCH | CH | DCH | CH | DCH | CH | DCH | CH | DCH | CH | DCH | CH | DCH |
| 0.1C/0.1C | 159.4 | 156.8 | 154.4 | 151.5 | 157.4 | 153.0 | 158.6 | 154.6 | 160.4 | 158.0 | 156.3 | 153.1 | 153.0 | 148.3 |
| 0.2C/0.2C | 157.5 | 156.3 | 152.0 | 150.9 | 153.7 | 152.3 | 155.4 | 154.0 | 158.9 | 157.1 | 155.4 | 152.0 | 150.1 | 145.2 |
| 0.2C/0.5C | 156.8 | 155.1 | 151.3 | 148.0 | 152.7 | 150.6 | 154.6 | 152.7 | 157.6 | 156.3 | 152.1 | 150.7 | 146.7 | 134.4 |
| 0.2C/1C | 155.7 | 153.5 | 150.6 | 145.3 | 151.4 | 149.4 | 153.4 | 151.1 | 156.8 | 154.7 | 150.0 | 148.8 | 137.2 | 120.6 |
| 0.2C/1C | 156.5 | 146.1 | 149.1 | 134.6 | 152.5 | 143.3 | 154.1 | 146.9 | 156.9 | 141.3 | 150.8 | 136.2 | 122.5 | 101.8 |
| ICDE | 98.4 | | 98.1 | | 97.2 | | 97.5 | | 98.5 | | 98.0 | | 96.9 | |
| C-rate (1C/0.1C) | 97.9 | | 95.9 | | 97.7 | | 97.9 | | 97.9 | | 97.2 | | 81.3 | |
| C-rate (2C/0.1C) | 93.6 | | 88.8 | | 93.6 | | 95.0 | | 89.4 | | 89.0 | | 68.6 | |

CH: charge;
DCH: discharge;
ICDE: initial charge/discharge efficiency

TEST EXAMPLE 2

Safety Evalution

In order to evaluate the safety of lithium secondary batteries including the cathode which has been modified with the ionic liquid according to the present invention, the following test was performed.

Each of the batteries of Examples 1 to 4 and Comparative Examples 1 to 3 was charged to 4.2V, disassembled to separate only the cathode. The separated cathode was evaluated for thermal stability with the electrolyte by a differential scanning calorimeter (DSC). The DSC analysis was performed by scanning the cathode at a heating rate of 5° C./min up to 350° C. under a nitrogen atmosphere.

Figure 8:
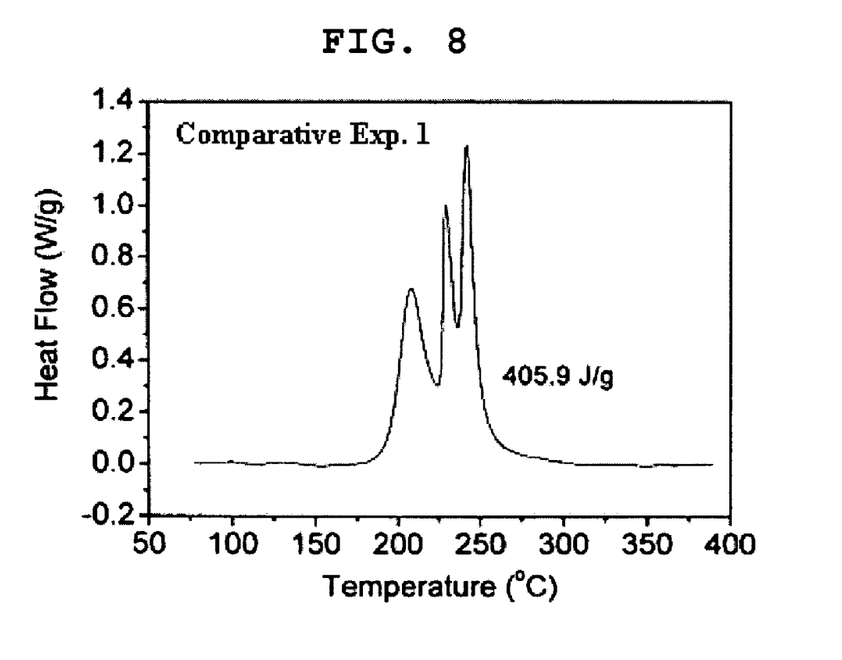

The lithium secondary battery of Comparative Example 1 with no use of the ionic liquid showed a heat release of about 405.9 J/g (see FIG. 8), whereas the lithium secondary battery of Examples 1 to 4 prepared with the addition of the ionic liquid showed a heat release up to about 200 J/g, indicating the effect of a reduction of about 50% in heat release (see FIGS. 4, 5 6 and 7). This suggests that the lithium secondary batteries made by using the ionic liquid as the cathode additive have a greatly improved safety.

Figure 9:
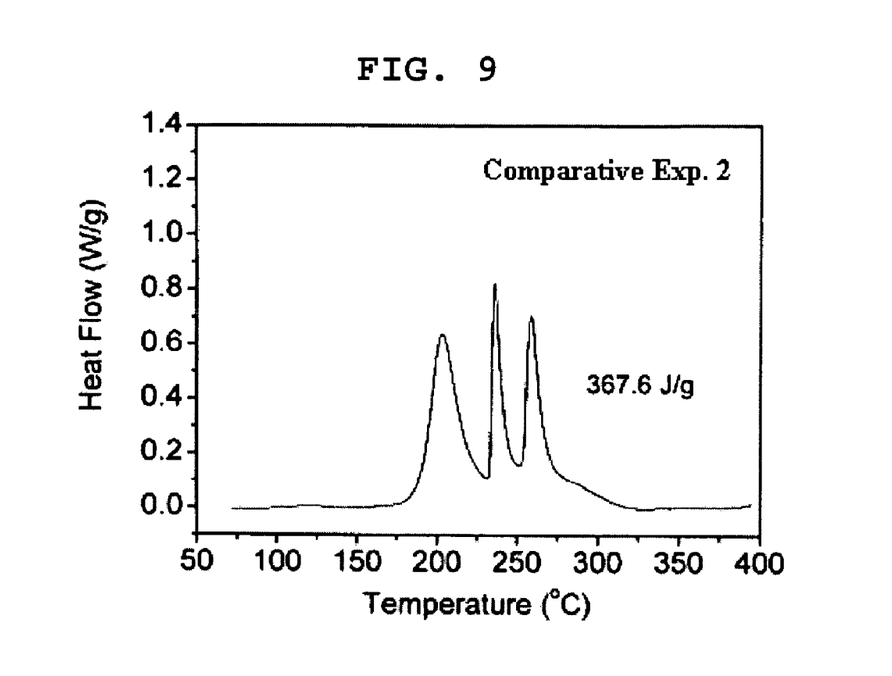
Figure 10:
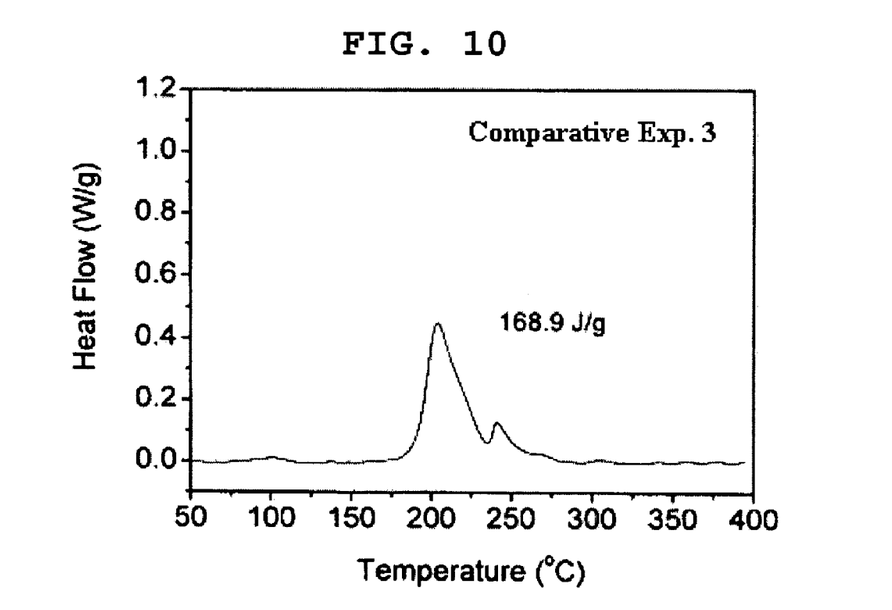

Meanwhile, the battery of Comparative Example 2 preparing with the addition of 3 parts by weight of the ionic liquid to the electrolyte solution did not show a great reduction in heat release, similarly with the case of the above performance evaluation (see FIG. 9). On the other hand, the battery of Comparative Example 3 prepared with the addition of 10 parts by weight of the ionic liquid to the electrolyte solution showed a reduction in heat release, which is equal to those of the batteries prepared in Examples 1 to 4 (see FIG. 10).

INDUSTRIAL APPLICABILITY

As described above, according to the present invention, the cathode modified with the ionic liquid is used in batteries, so that the safety of the batteries can be improved without causing a significant deterioration in the battery performance.

The invention claimed is:

1. A cathode produced from a cathode slurry comprising:
   (a) a cathode active material based on a lithium-containing metal composite oxide or a chalcogenide compound; and
   (b) an ionic liquid, wherein the ionic liquid is added at an amount of 0.1-30 parts by weight based on 100 parts by weight of the cathode active material.

2. The cathode of claim 1, wherein the cation of the ionic liquid is at least one selected from the group consisting of imidazolium, pyrazolium, triazolium, thiazolium, oxazolium, pyridazinium, pyrimidinium, pyrazinium, ammonium, phosphonium, pyridinium and pyrrolidinium, which are substituted or unsubstituted with a $C_{1-15}$ alkyl group.

3. The cathode of claim 1, wherein the anion of the ionic liquid is at least one selected from the group consisting of $PF_6^-$, $BF_4^-$, $CF_3SO_3^-$, $N(CF_3SO_2)_2^-$, $C(CF_2SO_2)_3^-$, $AsF_6^-$, $SbF_6^-$, $AlCl_4^-$, $NbF_6^-$, $HSO_4^-$, $ClO_4^-$, $CH_3SO_3^-$ and $CF_3CO_2^-$.

4. The cathode of claim 1, wherein the ionic liquid is a zwitterionic compound.

5. The cathode of claim 1, wherein the lithium-containing metal composite oxide is a lithium-containing oxide including at least one element selected from the group consisting of alkali metals, alkaline earth metals, Group 13 elements, Group 14 elements, Group 15 elements, transition metals and rare earth elements.

6. The cathode of claim 1, wherein the chalcogenide compound is at least one selected from the group consisting of $TiS_2$, $SeO_2$, $MoS_2$, $FeS_2$, $MnO_2$, $NbSe_3$, $V_2O_5$, $V_6O_{13}$, and $CuCl_2$.

7. An electrochemical device comprising:
   (a) a cathode including:
   (b) an anode;
   (c) a separator; and
   (d) an electrolyte solution.

8. The electrochemical device of claim 7, wherein the cathode of comprised electrochemical device is a cathode according to claim 2.

9. The electrochemical device of claim 7, wherein the cathode of comprised electrochemical device is a cathode according to claim 3.

10. The electrochemical device of claim 7, wherein the cathode of comprised electrochemical device is a cathode according to claim 4.

11. The electrochemical device of claim 7, wherein the cathode of comprised electrochemical device is a cathode according to claim 5.

12. The electrochemical device of claim 7, wherein the cathode of comprised electrochemical device is a cathode according to claim 6.

13. The electrochemical device of claim 7, which is a lithium secondary battery.

\* \* \* \* \*